US012654140B2

(12) United States Patent
Rohovec et al.

(10) Patent No.: US 12,654,140 B2
(45) Date of Patent: Jun. 16, 2026

(54) DEVICE AND METHOD FOR DISPERSING GASES INTO LIQUIDS

(71) Applicants: Messer SE & Co. KGaA, Bad Soden (DE); Messer Austria GmbH, Gumpoldskirchen (AT)

(72) Inventors: Joachim Rohovec, Leobersdorf (AT); Thomas Berger, Essen (DE)

(73) Assignees: Messer SE & Co. KGaA, Bad Soden (DE); Messer Austria GmbH, Gumpoldskirchen (AT)

( * ) Notice: Subject to any disclaimer, the term of this patent is extended or adjusted under 35 U.S.C. 154(b) by 339 days.

(21) Appl. No.: 18/554,561

(22) PCT Filed: Mar. 17, 2022

(86) PCT No.: PCT/EP2022/056976
§ 371 (c)(1),
(2) Date: Oct. 9, 2023

(87) PCT Pub. No.: WO2022/218636
PCT Pub. Date: Oct. 20, 2022

(65) Prior Publication Data

US 2024/0198300 A1 Jun. 20, 2024

(30) Foreign Application Priority Data

Apr. 15, 2021 (DE) ..................... 10 2021 001 986.5

(51) Int. Cl.
*B01F 23/23* (2022.01)
*B01F 23/231* (2022.01)
(Continued)

(52) U.S. Cl.
CPC ...... *B01F 23/23231* (2022.01); *B01F 23/231* (2022.01); *B01F 25/21* (2022.01); *B01F 25/53* (2022.01)

(58) Field of Classification Search
CPC ............................... B01F 23/23; B01F 23/231
See application file for complete search history.

(56) References Cited

FOREIGN PATENT DOCUMENTS

| | | | |
|---|---|---|---|
| EP | 0322925 | A2 | 7/1989 |
| EP | 0477846 | A1 | 4/1992 |

(Continued)

OTHER PUBLICATIONS

International Search Report and Written Opinion in PCT/EP2022/056976, dated Jul. 4, 2022, 6 pages.

*Primary Examiner* — Robert A Hopkins
(74) *Attorney, Agent, or Firm* — Andrus Intellectual Property Law, LLP

(57) ABSTRACT

A device according to the invention for dispersing a gas into a liquid comprising a liquid volume and a nozzle which is immersed in the liquid volume below a liquid level. The nozzle has a conical annular gap at the tip of which a nozzle opening is provided, and a liquid feed line opening tangentially into the conical annular gap. A gas feed line for a gas to be dispersed into the liquid volume opens into the liquid feed line, into the annular gap or in the region of the nozzle opening. The nozzle causes a strong swirling movement in the liquid fed into the liquid volume, which allows good dispersion of the gas that has been introduced via the gas feed line.

16 Claims, 3 Drawing Sheets

(51) Int. Cl.

| | |
|---|---|
| ***B01F 23/232*** | (2022.01) |
| ***B01F 25/21*** | (2022.01) |
| ***B01F 25/53*** | (2022.01) |

(56) References Cited

FOREIGN PATENT DOCUMENTS

| | | | | |
|---|---|---|---|---|
| EP | 0963784 | A1 | | 12/1999 |
| EP | 2327298 | A1 | | 6/2011 |
| EP | 2540387 | A | | 1/2013 |
| FR | 2825996 | A1 | | 12/2002 |
| JP | H11333491 | A | * | 12/1999 |
| JP | 2000093772 | A1 | | 4/2000 |
| WO | 2001097958 | A1 | | 12/2001 |
| WO | 2013108548 | A1 | | 7/2013 |
| WO | 2014192896 | A1 | | 12/2014 |
| WO | 2016083043 | A1 | | 6/2016 |
| WO | 2016083047 | A1 | | 6/2016 |

* cited by examiner

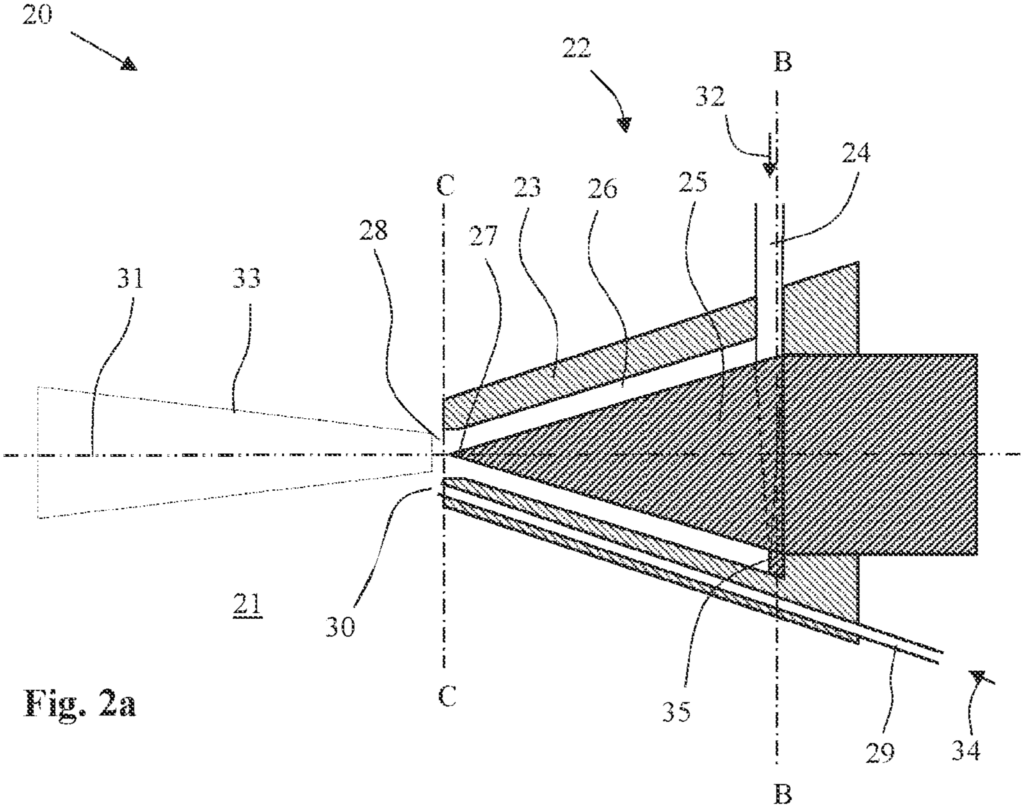
Fig. 2a
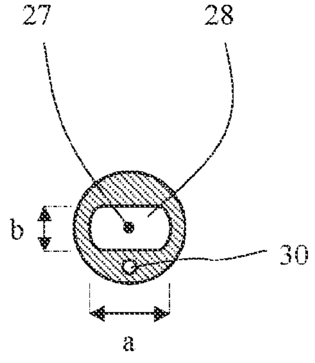
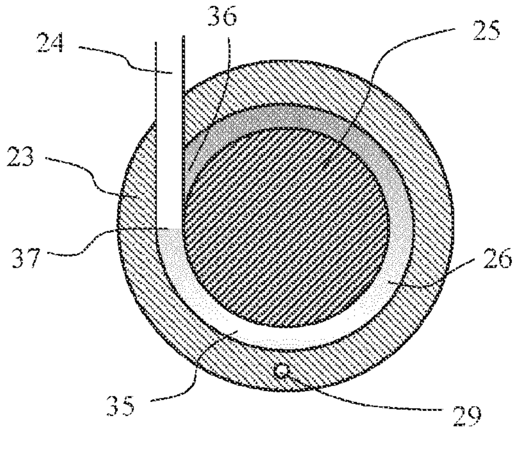
Fig. 2c
Fig. 2b

DEVICE AND METHOD FOR DISPERSING GASES INTO LIQUIDS

CROSS-REFERENCE TO RELATED APPLICATIONS

The present application is the U.S. national stage application of international application PCT/EP2022/056976, filed Mar. 17, 2022, which international application was published on Oct. 20, 2022, as International Publication WO 2022/218636 A1. The international application claims priority to German Patent Application No. 10 2021 001 986.5 filed Apr. 15, 2021. The above-noted applications are hereby incorporated herein by reference.

FIELD

The invention relates to a device and to a method for dispersing gases into liquids.

BACKGROUND

The introduction of gases into liquids is an important constituent part of process engineering. In the wastewater treatment sector, for example, oxygen is introduced for improving the treatment of sewage; carbon dioxide is used for regulating the pH value of the water during neutralizing. It is advantageous herein, in particular for energetic reasons, to introduce the gases into the liquid to be treated in a positively distributed way by generating ideally small gas bubbles.

In the process, the gases are often introduced via porous members such as, for example, sintered ceramics or metals, or via perforated hoses. Perforated hoses are indeed a relatively cost-effective method for introducing gases into a liquid. However, the gas bubbles generated are typically rather large and can be modified only within tight limits. Owing to the rapid floatation of comparatively large gas bubbles and the minor surface available for dissolving the gas in the liquid (oxygen exchange), large quantities of the gas reach the surface and are thus lost in terms of the process. Therefore, such hose systems are only suitable for very deep water tanks.

Sintered materials are somewhat more suitable than perforated hoses in terms of the achievable bubble size. However, a relatively high complexity in terms of construction is required here. In planar introduction systems, any alignment which is not entirely precise will moreover lead to a non-uniform discharge of gas. Furthermore, in the case of comparatively long production stops there is the risk that solids contained in the liquid will invade and clog the pores of the material.

Injectors in which a liquid is guided through a pipeline and is mixed with a gas in the process have proven successful as an alternative to the aforementioned methods. The mixture created is subsequently fed to a treatment region, for example a vessel or a tank filled with the liquid. The gas is introduced, for example, at a Venturi system disposed in the pipeline, in that a flow generated in the liquid automatically suctions the gas. The liquid in the pipeline is, for example, the actual liquid from the treatment region, which is conveyed by means of a pump in the circuit, or said liquid emanates from a separate vessel or a line. Systems of this type are known, for example from publications EP 2 327 298 A1, EP 0 477 846 A1, EP 0 322 925 A2, or FR 2 825 996 A1.

When using an injector with a Venturi nozzle it could be observed that, due to the buoyancy of the gas, the liquid/gas mixture formed in the Venturi system tends to separate into a dual-phase flow. Moreover, the flow rate is reduced owing to the typical cross-sectional enlargement at the exit side of a Venturi system. Turbulences, which have briefly ensured a relatively good mixing result in the tightest cross section, are dissipated, and the liquid and undissolved portions of the gas separate in the further course of the pipeline, said gas portions accumulating in the upper parts of the pipeline and coagulating to form comparatively large gas bubbles. While attempts can be made to promote the introduction or dissolution of the gas by means of mixing tubes, these systems are still capable of improvement in terms of their efficiency.

It has furthermore been proposed to generate fine gas bubbles, so-called "microbubbles", by means of a swirl chamber. Here, the liquid to be treated is introduced tangentially into a cylindrical or conical chamber, as a result of which the liquid situated in the latter is set in rotation. Owing to the centrifugal forces acting in the swirl chamber, the gas which is fed to the liquid ahead of or in the swirl chamber concentrates along the axis while the denser liquid accumulates radially on the outside. The liquid/gas mixture exits in the shape of a vortex at a bore which is incorporated centrally in an end side of the swirl chamber. Given sufficiently high flow rates and rotating speeds, the gas is finely dispersed in the liquid by turbulence and shear forces in the process. Systems of this type are known, for example from EP 0 963 784 A1, WO 2014 192 896 A1, or WO 2016 083 047 A1.

These systems correspond to a hydro cyclone with a separation of the individual phases according to density. The fluid with the lowest density rotates along the axis in the center, while the denser constituent parts, such as solids contained in the liquid, are displaced into the outer region and concentrate in the latter. During operation with such liquids which are loaded with solids, this leads to overloading of the swirl chamber and ultimately to clogging of the exit opening. This applies in particular when additional static installations for generating a swirl are provided within the swirl chamber, as is the case, for example, in the subject matter of WO 2014 192 896 A1. Therefore, these systems are also not suitable for use with suspensions, i.e. liquids with contaminations in the form of solids.

SUMMARY

The invention is therefore based on the object of specifying a possibility for dispersing a gas into a liquid, which overcomes the disadvantages of the prior art.

A device according to the invention for dispersing a gas into a liquid comprises a liquid volume and a nozzle for introducing a liquid into the liquid volume. The nozzle has a conical annular gap that is disposed between a conical internal face of a nozzle casing and a guide cone and on the tip of said annular gap, by way of a nozzle opening into the liquid volume, and a liquid infeed which opens tangentially into the conical annular gap. The device furthermore comprises a gas infeed for a gas to be dispersed into the liquid volume, which gas infeed opens out into the liquid infeed and/or into the annular gap and/or in the region of the nozzle opening, i.e. directly at the nozzle opening per se or downstream toward the nozzle opening in the liquid volume (when viewed in the direction of the exiting liquid).

The width of the annular gap, i.e. the spacing between the internal wall of the nozzle casing and the external wall of the guide cone, should not at any point be greater than the internal diameter of the liquid infeed at the mouth of the latter leading into the annular gap. The annular gap may have an acute or else an obtuse opening angle. For example, the opening angle is between 30° and 180°, preferably between 45° and 170°, particularly preferably between 60° and 135°. The annular gap forces the tangentially entering liquid to perform a spiral movement. The radial spacing between the conical internal face of the nozzle casing and the external face of the guide cone is constant between the mouth of the liquid infeed and the tip of the guide cone, or decreases steadily in the direction of the nozzle opening; an enlargement of the spacing between the delimiting faces of the annular gap between the mouth of the liquid infeed and the nozzle opening, for example while forming a mixing chamber, is not provided according to the invention. Therefore, the available volume for the liquid in the annular gap decreases steadily up to the nozzle opening, as a result of which the axial speed as well as the rotating speed are continuously increased. In particular, due to the liquid being guided through an annular gap, the rotating speed is higher than in the case of a hollow conical nozzle body of otherwise identical size. As a result of the high rotating speed, the liquid at the nozzle opening is introduced as an intensely swirled liquid jet into the surrounding liquid volume, a zone with a greatly reduced pressure being present along the axis of said intensely swirled liquid jet. The gas, which is simultaneously introduced by way of the gas infeed, makes its way into the liquid jet, is conjointly with the latter introduced into the surrounding liquid volume and only at this point, thus ahead of the nozzle opening, is intensively mixed with the liquid while forming minute bubbles.

It has been surprisingly demonstrated that the presence of mixing chambers and the like within the nozzle, owing to the pressure ratios prevailing in the latter, actually tends to cause liquid, gas and any solids present in the liquid to separate. In contrast, the strictly conical annular gap provided according to the invention, having a constant radial spacing, or a radial spacing decreasing steadily in the direction toward the nozzle exit, between the internal face of the nozzle casing and the guide cone, prevents liquid and solids contained therein from separating within the nozzle. The mixture of liquid and gas is thus introduced far into the liquid volume.

There are three fundamental possibilities for introducing the gas. Firstly, the gas can be fed into the liquid already in the liquid infeed, thus upstream of the nozzle. In this case, the introduced gas reduces the viscosity of the liquid, and a considerable quantity of gas can be fed at a volumetric flow ratio of 1:1 or more with the liquid, without any reduction in the throughput of the liquid arising—as compared with the case without gas introduction—despite an overall increased volumetric flow. Moreover, the intense shear forces in the annular gap promote the mixing of gas and liquid. However, it is disadvantageous here that the gas has to be fed at the same pressure as the liquid, corresponding to the entry pressure of the liquid at the nozzle, since the more heavily compressed medium would otherwise make its way into the supply lines of the respective other.

Secondly, the gas from a gas supply line disposed in the nozzle casing or on the guide cone can be fed into the annular gap by way of one or a plurality of gas exit openings. In the simplest case, the gas exit opening of the gas infeed is a bore; but this can also be a nozzle or a member made of a porous material, such as, for example, of a sintered material of plastics material, ceramic or metal, in which the gas is introduced into the surrounding liquid by way of a multiplicity of exit openings, this resulting in the gas being introduced in the form of particularly fine pearls. Also, the entire guide cone, or parts thereof, can be configured as a porous sintered material member, the introduction of the gas taking place by way of the latter. However, in this variant, the pressure of the fed gas is also limited to the pressure value of the liquid in the annular gap.

Thirdly, the gas in the direction of the swirled liquid jet can be introduced into the liquid at a gas exit opening or gas exit nozzle disposed centrally in the tip of the guide cone, or disposed laterally to the nozzle casing. The fed gas is suctioned into the zone with a reduced pressure in the liquid jet, and conjointly with the introduced liquid is distributed far into the liquid volume. The high pressure difference between the pressure of the fed gas and the pressure within the zone with a reduced pressure in the liquid jet enables the throughput of a high quantity. As a result, in advantageous design embodiments of the invention, the gas can in particular also be introduced at sonic speed or ultrasonic speed. Moreover, a suction acting on the exiting liquid is generated, which promotes the delivery of the liquid. In this design embodiment, there is no mixing of gas and liquid within the nozzle, and both media can be fed at different pressures; for example, the gas is fed at a pressure of 10-20 bar, and the liquid is fed at a pressure of 2-3 bar.

In a preferred design embodiment, two or more gas delivery nozzles can also be disposed laterally to the nozzle opening and preferably symmetrically to the latter. The gas delivery nozzle, or the gas delivery nozzles, can be aligned so as to be axially parallel to the conical annular gap, for example, so that the gas jet(s) exiting the gas delivery nozzle(s) is/are introduced into the liquid volume parallel to the swirled liquid jet. However, a particularly advantageous design embodiment of the invention provides that the at least one gas infeed terminates at a gas delivery nozzle or a gas delivery opening which is oriented at an angle, preferably at an acute angle, on the nozzle opening, so that the gas jet exiting the gas infeed is delivered in the direction toward the swirled liquid jet. This results in particularly intensive mixing of gas and liquid in the liquid jet.

An advantageous embodiment of the invention provides that a ramp which starts at the mouth of the liquid infeed and ascends helically in the direction of the cone tip is provided in the annular gap. The ramp is configured in such a way that the latter directs liquid entering by way of the tangential liquid infeed in the direction toward the nozzle opening, once said liquid in the annular gap has performed a rotation by at least the diameter of the liquid infeed. As a result, the liquid, having performed a revolution in the annular gap, does not impact, or impacts only to a minor extent, the flow of the liquid just entering from the liquid infeed, and turbulent flows which may lead to a reduction in the rotating speed are effectively avoided.

A preferably closed vessel filled with liquid, or a liquid-conducting line, is preferably provided as the liquid volume; however, this may also be an open vessel, a tank, or a body of water, for example a pond or a fish farm. In the case of a liquid-conducting line, for instance a pipeline passed through by a flow of the liquid, the intensely swirled flow prevents a new flow consisting of two separate phases from being formed again rapidly after the initial dispersion of a gas.

If the liquid volume is disposed within a vessel, it is expedient, in particular in the case of vessels without a flow and/or large-volume vessels, for example tanks or ponds, that additional means for generating a flow in the liquid are provided, so as to promote the distribution of the gas bubbles. These additional means are, for example, an agitation unit or a recirculation pump. Furthermore, the nozzle can be disposed within a line of a circuit, which is disposed within the liquid volume, or is supplied by the latter, or is fluidically connected to the liquid volume.

In an expedient refinement of the invention, the guide cone of the nozzle is configured to be axially adjustable so as to be able to take into account different requirements pertaining to the quantity of the liquid guided through the nozzle. Furthermore, a cylindrical front portion can be provided at the nozzle mouth, downstream of the tip of the guide cone, which cylindrical front portion causes the swirled liquid jet to be focused, without however reducing the axial or radial speed of the liquid exiting the nozzle opening.

The nozzle opening is preferably configured as a flat-jet nozzle, and thus has a larger width in horizontal terms than in vertical terms. For example, the nozzle opening has an oval shape with a width that is larger than the height. The agglomeration of gas bubbles is reduced in this way, because there are fewer gas bubbles in vertical terms.

A preferred design embodiment of the invention provides that the liquid is guided in a circuit. To this end, the nozzle is connected to a return line for circulating the liquid from the liquid volume. A conveying unit, for example an electric pump, by means of which liquid from the liquid volume is continuously retrieved and directed into the nozzle, is preferably disposed in the return line.

The object of the invention is also achieved by a method having the features of patent claim 11.

In a method according to the invention for dispersing a gas into a liquid, liquid is fed to a nozzle of the type described above, which is equipped with a conical annular gap, wherein the liquid is supplied tangentially by way of a liquid infeed that opens tangentially into the annular gap. The liquid in the annular gap is forced into a path constricted in the shape of a spiral, and at a nozzle opening disposed on the tip of the conical annular gap, below the liquid level of a liquid volume, emerges in the form of a swirled liquid jet. The gas to be dispersed is introduced into the liquid infeed and/or into the nozzle and/or into the swirled liquid jet ahead of the nozzle opening.

The gas to be dispersed is preferably at least partly introduced in the form of a gas jet directed toward the swirled jet of the liquid exiting into the liquid volume at the nozzle opening. For example, the introduction of the gas takes place either centrally into the swirled liquid jet and/or by way of gas delivery nozzles which are disposed laterally on the nozzle and are directed toward the swirled jet.

The liquid guided through the nozzle can be a liquid which is introduced into the liquid volume from a reservoir, a tank or a line, or can be a liquid from the liquid volume per se, which is guided in the circuit and is fed to the nozzle by means of a pump or a comparable conveying unit.

A mixing ratio of liquid guided through the nozzle to gas to be dispersed between 5:1 to 1:2 is particularly suitable for dispersing the gas as finely as possible in the liquid.

A further improvement of the distribution of the gas can be achieved in that the gas is ionized prior to being fed to the liquid, because the gas bubbles are stabilized as a result and rapid agglomeration is avoided.

The liquid is, for example, water, or an aqueous solution or aqueous suspension, in particular wastewater or cooling water. The introduced gas is, for example, air, pure oxygen or carbon dioxide.

The gas is typically fed in the gaseous state. However, in order to in particular cause a cooling effect in the liquid volume in addition to the dispersion of the gas, an advantageous embodiment of the method according to the invention provides that the gas to be dispersed is fed in the cold-liquefied state or pressure-liquefied state. A construction mode of the nozzle according to the invention in which the introduction of the gas takes place in the direction of the swirled liquid jet in the liquid volume by way of one or a plurality of gas exit openings disposed on the tip of the guide cone and/or laterally on the nozzle opening is expedient in this respect. This not only enables the introduction of the gas at a pressure that is independent of the pressure of the liquid but, as a result of the high speed of the exiting liquefied gas and the intense movement of the surrounding liquid, intensive mixing is moreover guaranteed, on the one hand, and icing of the gas exit opening by freezing liquid is prevented, on the other hand. For example, in this way, carbon dioxide in the liquid state can be introduced into a liquid volume composed of water at a pressure of, for example, 6 to 10 bar.

Using the method according to the invention, or the device according to the invention, bubble sizes of the gas to be dispersed in the micrometer range, thus with a size of 1 micrometer to 100 micrometers, preferably 1 micrometer to 10 micrometers (microbubbles), or below, thus between 0.1 micrometer and 1 micrometer (nanobubbles), for example, are able to be produced in the liquid volume, which bubbles can be widely dispersed in the liquid volume due to their minor buoyancy. Gas bubbles with a very small volume can in particular be generated at high liquid proportions (volumetric flow ratio of liquid to gas of 5:1 or above).

The device according to the invention, or the method according to the invention, can be used for various applications, in particular in the wastewater treatment sector. One preferred use lies in the introduction of air, air enriched with oxygen, or of oxygen (with a purity in excess of 95% by volume) into wastewater for improving the treatment of sewage, or for introducing carbon dioxide for regulating the pH value of wastewater.

BRIEF DESCRIPTION OF THE DRAWINGS

Exemplary embodiments of the invention are to be explained in more detail by means of the drawings, in which, in schematic views:

FIG. 2*a* shows a device according to the invention in a second embodiment, in a longitudinal sectional view;

FIG. 2*b* shows the device from FIG. 2*a* in a cross-sectional view along a section line B-B in FIG. 2*a;*

FIG. 2*c* shows the device from FIG. 2*a* in a cross-sectional view along a section line C-C in FIG. 2*a*.

DETAILED DESCRIPTION

Figure 1A:
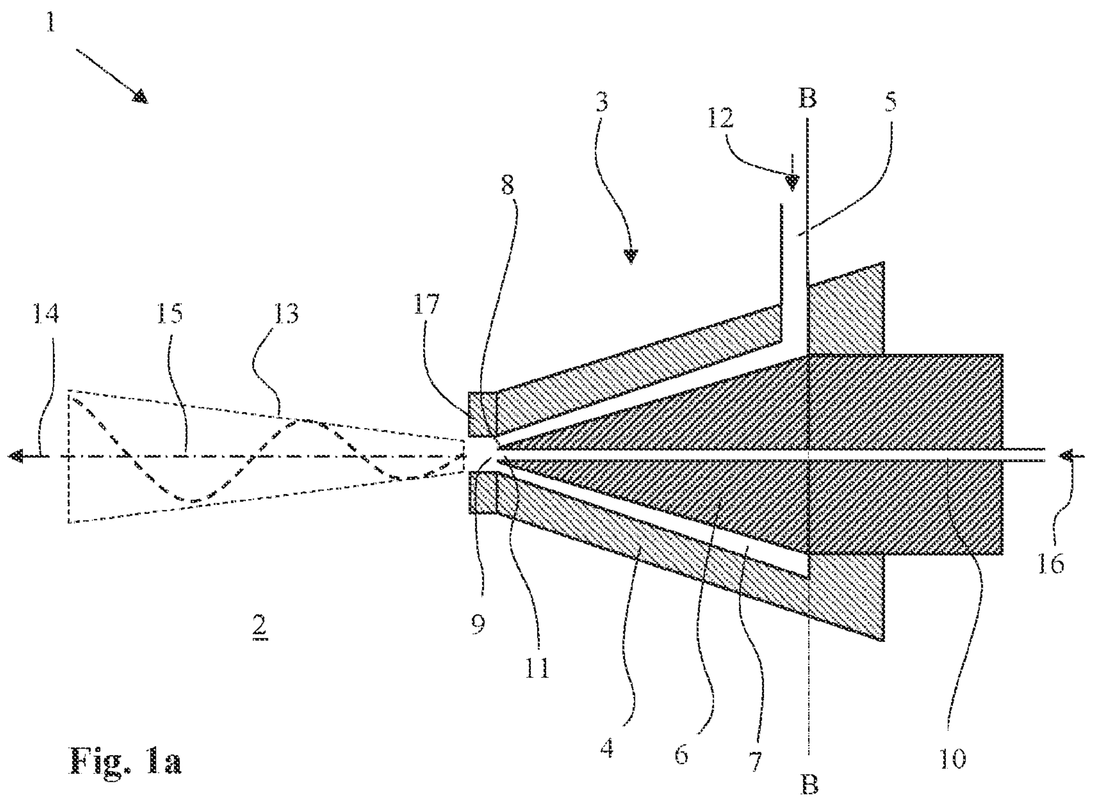
FIG. 1*a* shows a device according to the invention in a first embodiment, in a longitudinal sectional view.
Figure 1B:
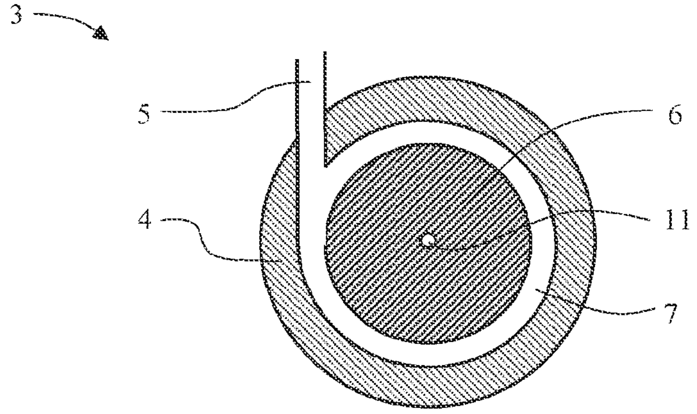
FIG. 1*b* shows the device from FIG. 1*a* in a cross-sectional view along a section line B-B in FIG. 1*a;*

The device 1 shown in FIG. 1*a* and FIG. 1*b* comprises a nozzle 3 which is received within a liquid volume 2. The nozzle 3 comprises a nozzle casing 4 having a conical internal face into which a liquid infeed 5 opens tangentially. A likewise conically shaped guide cone 6 is disposed within the nozzle casing 4 in such a manner that a conical annular gap 7 lies open between the internal wall of the nozzle casing 4 and the external wall of the guide cone 6, preferably in such a manner that the cone tip 8 of the guide cone 6 is substantially co-aligned with a nozzle opening 9 of the nozzle 3. The nozzle opening 9 is preferably of such a size that the flow cross section thereof is substantially equal to or smaller than the flow cross section of the liquid infeed 5. The internal face of the conical nozzle casing 4 and the external face of the guide cone 6 here can have an identical opening angle; however, it is also conceivable that the opening angle of the external face of the guide cone 6 is more acute than the opening angle of the internal face of the nozzle casing 4, the spacing of the nozzle casing 4 and the guide cone 6 reducing in the direction toward the nozzle opening 9, as is shown in FIG. 1*a*.

Moreover, the nozzle opening 9 can have a circular cross section or a horizontally enlarged cross section as explained in more detail hereunder. The guide cone 6 can be fixedly assembled within the nozzle casing 4, or else be received so as to be axially movable in the latter—not shown here.

A gas infeed 10, which is connected to a gas source not shown here, for example a pressurized gas cylinder or a pressurized tank, runs longitudinally along a central axis of the guide cone 6. The gas infeed 10 by way of a gas exit opening 11, which may also be configured as a nozzle, at the cone tip 8 of the guide cone 6 opens out into the nozzle opening 9.

During the operation of the device 1, a liquid to be treated is directed in the direction of the arrow 12 into the annular gap 7 by way of the liquid supply line 5, for example at a pressure of 2-3 bar. The liquid in the annular gap 7 is set in rapid rotation, the angular velocity of the latter movement increasing up to the nozzle opening 9 due to the radius of the annular gap 7 decreasing in the direction of flow. For the same reason, the linear speed component directed in the direction of the nozzle opening 9 also increases. The liquid leaves the nozzle 3 at the nozzle opening 9 and is introduced in the liquid volume 2 as an intensely swirled jet 13 at a high speed in the direction of the arrow 14. Due to the high rotating speed, a zone with a greatly reduced pressure is created along a central axis 15 of the jet 13.

A gas to be dispersed in the liquid volume 2 is directed inward in the direction of the arrow 16 at a high pressure of, for example, 10 bar to 20 bar, by way of the gas infeed 10. The gas exits the gas exit opening 11 at a high speed and from there makes its way into the interior of the swirled liquid jet 13. Conjointly with the latter, the gas is introduced deep into the liquid volume 2, and owing to the forces acting within the swirled jet 13, is gradually divided into fine bubbles with a diameter of a few micrometers, for example, and is finely distributed (dispersed) in the liquid volume 2. A cylindrical front portion 17, which is optionally disposed on the nozzle opening 9 ahead of the cone tip 8, leads to the liquid jet 13 being more heavily focused.

The device 20, shown in FIGS. 2*a*, 2*b* and 2*c*, likewise comprises a nozzle 22 which is received within a liquid volume 21. The nozzle 22 has a nozzle casing 23 having a conical internal face, a liquid infeed 24 opening tangentially into the latter. A likewise conically shaped guide cone 25 is disposed within the nozzle casing 23 in such a manner that a conical annular gap 26 lies open between the internal wall of the nozzle casing 23 and the external wall of the guide cone 25, specifically in such a manner that the cone tip 27 of the guide cone 25 is substantially co-aligned with a nozzle opening 28 of the nozzle 22. In this exemplary embodiment, the opening angles of the internal face of the nozzle casing 23 and the external face of the guide cone 25 are identical.

In the exemplary embodiment as per FIGS. 2*a*-2*c* the nozzle opening 28 has a horizontally enlarged cross section, for example the oval cross-section shown in FIG. 2*c*, in which the horizontal width a of the nozzle opening 28 is larger than the vertical height b.

The gas to be dispersed in the liquid volume 21 in the device 20 is directed inward by way of a gas infeed 29 which—as shown here—is disposed within the nozzle casing 23, or else outside the nozzle casing 23, and at a gas exit opening 30 exits laterally to the nozzle opening 28 but so as to be inclined in the direction toward a central axis 31 of the nozzle 22.

During the operation of the device 20, a liquid to be treated is directed in the direction of the arrow 32 into the annular gap 26 via the liquid infeed 24 at a pressure of 2 bar to 3 bar, for example. The liquid in the annular gap 26 is set in rapid rotation, the angular velocity of the latter movement increasing up to the nozzle opening 28 due to the radius of the annular gap 26 decreasing in the direction of flow. For the same reason, the linear speed component directed in the direction of the nozzle opening 28 also increases. The liquid leaves the nozzle 22 at the nozzle opening 28. Due to the horizontally enlarged nozzle opening 28, a planar jet pattern 33 is generated within the liquid volume 21. For example, two primary jets swirling in the same direction are formed in the liquid entering the liquid volume 21, a secondary jet in the opposite direction being formed therebetween, wherein a zone with a heavily reduced pressure is formed in each of the jets due to the high rotating speed.

A gas to be dispersed in the liquid volume 21 is directed inward in the direction of the arrow 34 by way of the gas infeed 29, at a high pressure of 10 bar to 20 bar, for example. The gas exits the gas exit opening 30 at a high speed, and makes its way from there into the interior of the swirled liquid jets in the jet pattern 33. In the process, the gas is introduced deep into the liquid volume 21, and owing to the forces acting within the swirled jets, is gradually divided into fine bubbles with a diameter of a few micrometers, for example, and is finely dispersed in the liquid volume 21.

In order to guarantee an ideally efficient rotational acceleration of the liquid introduced into the nozzle 20, a ramp 35 is provided in the annual gap 26. Owing to the ramp 35, the base area of the annular gap 26 does not form a flat circular ring, but forms a winding of a screw surface which ascends in the direction toward the nozzle opening 26 and which, at the ramp end 36 thereof, by a distance corresponding to the diameter of the liquid supply line 24, extends further in the direction of the nozzle opening 28 than at the entry point 37 of the liquid supply line 24 into the annular gap 26. In this way, the liquid, after passing the ramp 35, does not laterally impact the flow of the liquid directed inward by way of the liquid supply line 24, but is offset thereto, as a result of which turbulences which restrict the acceleration of the liquid are avoided.

Moreover, a nozzle 22 having a gas infeed 29 set at an acute angle does not mandatorily have to have a horizontally enlarged nozzle opening 28; of course, the nozzle opening 28 may also have a circular cross section, or the nozzle opening 9 of the nozzle 3 may have a horizontally enlarged cross section. Likewise, a ramp 35 can also be provided in an arrangement corresponding to that of the nozzle 1.

Figure 3:
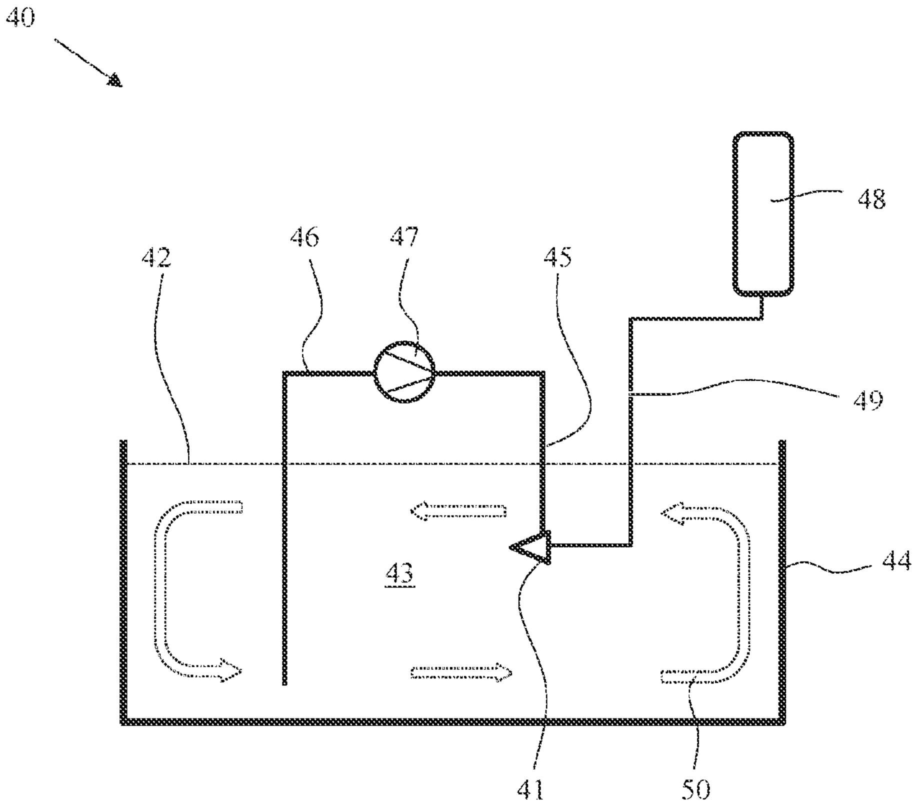
FIG. 3 shows a device according to the invention for treating a liquid in a vessel.

Shown in FIG. 3 is an exemplary embodiment in which a liquid volume is continuously circulated by means of a device according to the invention and is mixed with gas in the process.

The device 40 shown in FIG. 3 comprises a nozzle 41 according to the invention, this being, for example, a nozzle 3, 22 of the type described above. The nozzle 41 is received in a liquid volume 43 below a liquid level 42, said liquid volume 43 being present in a vessel 44. The vessel 44 is, for example, a largely closed vessel, a wastewater treatment tank for receiving wastewater, or a fish farm.

The device 40 has a liquid infeed 45 which is fluidically connected to a return line 46 immersed in the liquid volume 43. A conveying unit 47, for example a pump, is disposed in the return line 46. Liquid is continuously retrieved from the liquid volume 43 and supplied into the nozzle 41 by means of the conveying unit.

The gas to be dispersed into the liquid volume 43 is retrieved from a gas source 48, for example a pressurized vessel or a pressurized line, fed to the nozzle 41 by way of a gas infeed 29, and dispersed in the liquid in the way described above. The gas is, for example, oxygen or carbon dioxide. For example, gas and liquid are introduced by way of the nozzle 41 at a gas-to-liquid volumetric flow ratio such as 2:1. In order to improve mixing in particular in the case of large vessels, means not shown here, for example a recirculation pump, for generating an additional flow 50 can be provided in the vessel.

Owing to the special construction of the nozzle, the device 40 according to the invention is suitable for dispersing the gas even when the liquid supplied into the nozzle 41 by way of the return line 46 is heavily loaded with solid particles. Since the nozzle 41 contains neither voids such as mixing chambers, for example, nor static mixing elements, particles of this type do not accumulate within the nozzle 41 and are correspondingly unable to impede the functionality of the device 40. Rather, the conical configuration of the annular gap 7, 26, owing to the cross-sectional constriction, causes a high speed of the introduced liquid also in the axial direction, this facilitating the delivery and the distribution of the solids (or in more general terms: of substances with a higher density than the liquid per se) in the liquid volume.

LIST OF REFERENCE SIGNS

1 Device
2 Liquid volume
3 Nozzle
4 Nozzle casing
5 Liquid infeed
6 Guide cone
7 Annular gap
8 Cone tip
9 Nozzle opening
10 Gas infeed
11 Gas exit opening
12 Arrow
13 Jet
14 Arrow
15 Axis
16 Arrow
17 Cylindrical front portion
18 -
19 -
20 Device
21 Liquid volume
22 Nozzle
23 Nozzle casing
24 Liquid infeed
25 Guide cone
26 Annular gap
27 Cone tip
28 Nozzle opening
29 Gas infeed
30 Gas exit opening
31 Axis
32 Arrow
33 Jet pattern
34 Arrow
35 Ramp
36 Ramp end
37 Entry point
38 -
39 -
40 Device
41 Nozzle
42 Liquid level
43 Liquid volume
44 Vessel
45 Liquid infeed
46 Return line
47 Conveying unit
48 Gas source
49 Gas infeed
50 Flow

The invention claimed is:

1. A device for dispersing a gas into a liquid having a liquid volume, the device comprising:

a nozzle for feeding a liquid into the liquid volume, which nozzle has a conical annular gap that is disposed between a conical internal face of a nozzle casing and a guide cone and on a tip of said conical annular gap at a nozzle opening opens out into the liquid volume below a liquid level;

a liquid infeed which opens tangentially into the conical annular gap; and at least one gas infeed for a gas to be dispersed into the liquid volume, wherein the at least one gas infeed in the liquid volume opens out laterally to the nozzle opening and at an angle to a central axis of the conical annular gap.

2. The device as claimed in claim 1, wherein the at least one gas infeed is guided through the guide cone or the nozzle casing and opens out into the annular gap at a gas exit opening.

3. The device as claimed in claim 1, wherein the at least one gas infeed is guided through the guide cone and opens out into the nozzle opening at a gas exit opening disposed in the tip of the guide cone.

4. The device as claimed in claim 1, wherein a ramp which starts at a mouth of the liquid infeed and ascends helically in the direction of the nozzle opening is provided in the annular gap.

5. The device as claimed in claim 1, wherein a vessel filled with liquid, or a liquid-conducting line, is provided as the liquid volume.

6. The device as claimed in claim 1, wherein a vessel filled with liquid is provided as the liquid volume, and additional means for generating a flow in the liquid are disposed in the vessel.

7. The device as claimed in claim 1, wherein the guide cone of the nozzle is axially adjustable in relation to the conical internal face of the nozzle casing.

8. The device as claimed in claim 1, wherein the nozzle opening is configured as a flat-jet nozzle.

9. The device as claimed in claim 1, wherein the nozzle is connected to a return line for circulating the liquid from the liquid volume.

10. A method for dispersing a gas into a liquid, in which method:

a) a liquid is fed to a nozzle which has a conical annular gap, wherein the liquid is supplied into the annular gap by way of a liquid infeed that opens tangentially into the annular gap;

b) the liquid in the annular gap is forced into a path constricted in the shape of a spiral, and at a nozzle opening disposed on a tip of the conical annular gap, below a liquid level of a liquid volume, is ejected in the form of a swirled liquid jet into the liquid volume;

c) a gas to be dispersed is introduced into the liquid infeed and/or into the nozzle and/or into the swirled liquid jet ahead of the nozzle opening; and d) wherein the gas is ionized prior to being fed to the liquid.

11. The method as claimed in claim 10, wherein the gas to be dispersed is at least partly introduced in a gas jet directed toward the swirled jet of the liquid exiting into the liquid volume at the nozzle opening.

12. The method as claimed in claim 10, wherein the volumetric flow ratio of liquid guided through the nozzle to the fed gas to be dispersed is between 5:1 and 1:2.

13. The method as claimed in claim 10, wherein the gas is fed in a liquefied state into the swirled liquid jet ahead of the nozzle opening.

14. A device for dispersing a gas into a liquid having a liquid volume, the device comprising:

a nozzle for feeding a liquid into the liquid volume, which nozzle has a conical annular gap that is disposed between a conical internal face of a nozzle casing and a guide cone and on a tip of said conical annular gap at a nozzle opening opens out into the liquid volume below a liquid level;

a liquid infeed which opens tangentially into the conical annular gap; and at least one gas infeed for a gas to be dispersed into the liquid volume, which gas infeed opens out into the liquid infeed and/or the annular gap and/or in the region of the nozzle opening;

wherein the guide cone of the nozzle is axially adjustable in relation to the conical internal face of the nozzle casing.

15. The device as claimed in claim 14, wherein the at least one gas infeed is guided through the guide cone or the nozzle casing and opens out into the annular gap at a gas exit opening.

16. The device as claimed in claim 14, wherein the at least one gas infeed is guided through the guide cone and opens out into the nozzle opening at a gas exit opening disposed in the tip of the guide cone.

* * * * *